Patented Apr. 24, 1945

2,374,236

UNITED STATES PATENT OFFICE 2,374,236

SURFACE ACTIVE ALDOSIDE CONDENSATION PRODUCTS

Paul Lawrence Salzberg and James Herbert Werntz, Wilmington, Del., assignors to E. I. du Pont de Nemours & Company, Wilmington, Del., a corporation of Delaware No Drawing. Application January 23, 1943,
Serial No. 473,422

11 Claims. (Cl. 260—210)

This invention relates to a process for producing new non-ionic surface-tension modifying compounds, more particularly to new condensation products which are valuable especially as assistants for the textile and related industries, and even more particularly to condensation products of aldoses, aldosides, or polyaldosides with polyhydric alcohols having a substituent of at least six but not more than forty carbon atoms.

An object of this invention is to provide new surface-tension modifying compounds which in view of their colloidal properties are suitable for use in the textile, leather, lacquer, paper, rubber and like industries. A further object is to provide new surface-active agents whose solubility in water does not depend on the presence of an ionic or cationic solubilizing groups; which agents are therefore substantially unaffected by the presence of salts such as may be present in hard water and of acids and bases, e. g., the ones customarily employed in textile-treating operations. Another object is to provide a practical method for the manufacture of synthetic non-ionic surface-active agents having colloidal properties. A still further object is to provide a novel and practical synthesis of non-ionic surface-tension modifying agents from low cost readily available raw materials. Another object is the preparation of new condensation products. Other objects will appear hereinafter.

These objects are accomplished by the following invention wherein new non-ionic surface-tension modifying compounds are obtained by reacting an open-chain aliphatic polyhydric alcohol having at least two and preferably five hydroxyl groups attached to a saturated acyclic aliphatic hydrocarbon radical to which is also attached, through a bivalent, inert, bridging radical, a monovalent acyclic hydrocarbon radical of at least six, and preferably at least eight, preferably not more than twenty-five and in any case not more than forty carbon atoms with a water soluble aldose or aldoside. The hydroxyls in the polyhydric alcohol are preferably on contiguous carbon atoms and the bridging radical is ether oxygen, thioether sulfur, carbonamido (—CONH— or CONAlkyl—),

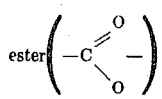

amino (—NAlkyl— or —NH—), methylene (—CH$_2$—), sulfonamido (—SO$_2$—NH— or —SO$_2$NAlkyl—), or sulfonic ester (—SO$_2$O—).

The term "inert" means that the solubility and surface activity of the products of this invention are not materially affected by the nature of the bridging radical. Thus, a compound having an amino group as the bridging radical is independent of the acidity of the solution for its surface activity and functions in alkaline and neutral solutions essentially the same as in acid solution.

In carrying out the process of this invention the long chain substituted polyhydric alcohol is heated with a water soluble aldose or aldoside at about 100–250° C. and preferably 150–200° C. in the presence of an acidic catalyst. The reaction is preferably carried out in an inert atmosphere either at atmospheric pressure or subatmospheric pressure. During the condensation an alcohol (in case aldosides are used) or water is evolved with subsequent increase in the viscosity of the melt. In order to assist in the removal of the alcohol or water, it is convenient to carry out the reaction in the presence of a catalyst at a temperature above the boiling point of the alcohol or of water while blowing with nitrogen or other inert gas. The ingredients of the reaction mixture are mutually soluble at the temperature of condensation. The preferred products are transparent, brittle solids readily soluble in water to give sudsing solutions of good clarity which are stable on storage.

The more detailed practice of the invention is illustrated by the following examples, wherein parts given are by weight. There are of course many forms of the invention other than these specific embodiments.

*Example 1—1-dodecylthiosorbitol-alpha-methyl glucoside condensation product*

One hundred eighty-three parts 1-dodecylthiosorbitol (0.05 mole) containing a trace of sulfonium salt and 194 parts alpha-methyl glucoside (0.01 mole) were fused together in a glass vessel equipped with a thermometer and a stirrer. At 140° C. the reaction mixture became homogeneous and methanol was evolved. After heating and stirring 30 minutes at 130–140° C. foaming subsided and the temperature was raised to 175° C. for 15 minutes. On cooling, the viscous melt formed a brown, brittle, transparent solid (310 parts). Three hundred ten parts of condensation product was recovered. A 24% solution in water was very viscous. The product analyzed 3.9% S; 50.7% C; 8.2% H. In warm or cold water the product gave sudsing solutions of good clarity which were stable in the presence of hydrochloric acid. The product was a very effective wool scouring agent in both hard and soft water. It was better than soap as a cotton scouring agent in soft water.

When 183 parts 1-dodecylthiosorbitol containing a trace of sulfonium salt was reacted with 97 parts alpha-methyl glucoside in a similar manner only a portion of the product was soluble and sudsed in water.

1-dodecylthiosorbitol is slightly soluble in hot water to yield weakly sudsing solutions; in cold water it is not sufficiently soluble to yield sudsing solutions.

1-dodecylthiosorbitol was condensed with 2 moles alpha-methyl glucoside in the presence of 0.002 mole methylbenzyloctadecylsulfonium methylsulfate by heating 30 minutes at 135–145° C. and 30 minutes at about 170° C. The product was completely soluble in cold water, cold methanol, boiling benzene and boiling acetic acid to the extent of at least 2.5 parts of product to 97.5 parts of the respective solvent while 2.5 parts did not completely dissolve in cold and boiling dioxane, cold benzene, cold acetic acid, cold and boiling ethanol, cold and boiling acetone in the amount of 97.5 parts of the respective liquids.

*Example II—1 - hexadecylthiosorbitol - alpha - methyl glucoside condensation product*

Four hundred twenty-two parts 1-hexadecylthiosorbitol (1 mole) containing a trace of sulfonium salt, and 388 parts alpha-methyl glucoside (2 moles) were heated at 170–175° C. for about one hour in a glass vessel equipped with a stirrer. The reaction mixture became homogeneous and methanol was evolved. On cooling the viscous melt, 710 parts of a brown, brittle solid was obtained. The product was purified by dissolving in 20,000 parts of hot water, cooling and decanting the supernatant solution. The decanted solution was filtered and the filtrate evaporated to dryness. The product analyzed 3.4% S; 51.5% C; 8.2% H. The product was a good wool scouring agent in both hard and soft water but was not quite as efficient as the product described in Example I.

*Example III—1 - octylthiosorbitol - alpha-methyl glucoside condensation product*

Fifty parts 1-octylthiosorbitol (0.16 mole) and 62 parts alpha-methyl glucoside (0.32 mole) were stirred at about 165° C. while blanketing with nitrogen. The reaction mixture became homogeneous but no methanol was given off. Small portions of iodine were added next until methanol was evolved. After heating 2 hours the brown, viscous melt set to 60 parts of a brittle solid on cooling. The product was dissolved in hot aqueous ethanol solution, treated with decolorizing carbon and filtered. Evaporation of the filtrate left a yellow, brittle solid which analyzed 5.3% S; 54.6% C; 8.2% H, and sudsed in cold water. The 1-octylthiosorbitol may be replaced by 1-hexylthiosorbitol.

*Example IV—1-dodecylthiosorbitol-dextrose condensation product*

Eighteen parts 1-dodecylthiosorbitol, containing a trace of sulfonium salt and 15 parts dextrose, were heated in a glass vessel. At 150° C. water was evolved and the reaction mixture became homogeneous and viscous. It was next heated at 150° C. at 30 mm. for one hour. On cooling, the product was a hard, brittle solid. The product gave strongly sudsing solutions in water. The aqueous solution was acidified with hydrochloric acid and boiled five minutes. The clarity and sudsing characteristics of the solution were unaffected. This type of product was an effective scouring agent for cotton in soft water.

*Example V—1 - hexadecylthiosorbitol - dextrose condensation product*

Twenty-one parts 1-hexadecylthiosorbitol, 27 parts dextrose and 0.1 part methylbenzyloctadecylsulfonium methylsulfate were heated in a glass vessel equipped with a stirrer. The reactants were heated at 150–155° C. at 50 mm. for about two hours. On cooling, the product was a brown solid, readily soluble in water. It was purified by treating a hot methanol solution with decolorizing carbon, filtering and evaporating the filtrate. The brown solid analyzed 3.4% S. The product was sparingly soluble in cold and boiling dioxane and acetone. It was sparingly soluble in cold benzene. It was almost completely soluble in hot benzene to form a sudsing solution. It formed a sudsing solution with water. It was sparingly soluble in cold but readily soluble in boiling acetic acid and methanol. It was sparingly soluble in cold ethanol and about 50% soluble in boiling ethanol. Solubility tests were made at about 2.5% concentration, i. e., 2.5 parts of the product were used per 97.5 parts of solvent.

*Example VI—N-tetradecyl-N-methyl glucamine-alpha-methyl glusoside condensation product*

One part N-tetradecyl-N-methylglucamine, 1.5 parts alpha-methyl glucoside and a small amount of iodine were heated one hour at 165–170° C. Methanol was evolved from the homogeneous reaction mixture. On cooling, the product was a brittle, transparent solid. The condensation product gave sudsing solutions in cold water.

*Example VII—Lauric-N-methyl glucamide-alpha-methyl glucoside condensation product*

Lauric-N-methylglucamide was condensed with alpha-methyl glucoside in the same manner as described in Example VI. The condensation product dissolved in cold water and gave strongly sudsing solutions.

*Example VIII—Lauric amide of tris(hydroxymethyl) aminomethane-alpha-methyl glucoside condensation product*

Three parts lauric amide of tris(hydroxymethyl)-aminomethane, $H_2NC(CH_2OH)_3$, and 3.9 parts alphamethyl glucoside formed a homogeneous reaction mixture when heated to 165° C. The addition of a small amount of iodine caused evolution of methanol, but reaction was incomplete. Small amounts of iodine were added at intervals during the heat treatment of about 7 hours. On cooling, the condensation product was a brown, brittle, transparent solid. It gave sudsing solutions in cold water.

*Example IX — Alpha-monstearin-alpha-methyl glucoside condensation product*

Alpha-monostearin and 3 mols of alpha-methyl glucoside formed a homogenous reaction mixture when heated to about 200° C. Addition of a small amount of iodine caused methanol to be evolved. After heating about 30 minutes the reaction mixture separated into two layers. On cooling the product was not homogeneous. The product was partially soluble in cold water and gave sudsing suspensions. This example of a condensation product of a dihydric alcohol represents a less preferred embodiment of the invention. Products from polyhydric alcohols of at least five hydroxyl groups are preferred because of their greater water solubility and their greater ease of preparation from the aldose or aldoside and the polyhydric alcohol.

Products with similar properties were obtained when monododecylglyceryl ether and 1,9,10-octadecanetriol were used in place of alpha-monostearin. In these experiments methylbenzyloctadecylsulfonium methylsulfate was used in place of iodine as the catalyst and the temperature was about 165–180° C.

*Example X — 1-dodecylthiosorbitol-polymethyl glucoside condensation product*

Polymethyl glucoside was made by heating at 180° C. for 2.5 hours 50 parts alpha-methyl glucoside with 0.0054 part sulfuric acid dissolved in 0.2 part methanol. The glassy, brittle polymer melted above 200° C. and was soluble in water. The methoxyl content was found to be 1.7% and the molecular weight by the cryoscopic method was about 700. One part 1-dodecylthiosorbitol containing a trace of sulfonium salt and 1.2 parts of the above polymethyl glucoside were heated to 170–180° C. Methanol vapor was evolved from the homogeneous reaction mixture. After heating about one hour the condensation product was very viscous and on cooling set to a hard, brittle solid. The condensation product was soluble in water and gave sudsing solutions.

Water-soluble products which gave sudsing solutions in cold water were also obtained by condensing one part of 1-dodecylthiosorbitol containing a trace of a sulfonium salt with one part of sucrose or maltose at about 150° C. The homogeneous melts evolved water vapor and after heating about 30 minutes were viscous. The sulfonium salt catalysts of Examples I, II, IV, and X were the addition products of the 1-alkylthiosorbitol and the corresponding alkyl halide.

In the process of this invention any polyhydric alcohol of the formula $(HO)_nYXR$ may be used. In this Y is an acyclic hydrocarbon radical of valence $n+1$, $n$ is an integer at least two and preferably at least five, R is a monovalent hydrocarbon radical of at least six and preferably at least eight carbon atoms preferably acyclic and X is a neutral inert bridging radical preferably thioether sulfur, ether oxygen, tertiary or secondary amino nitrogen as in —NH— or —NAlkyl—, carbonamido (—CONH— or —CONAlkyl—), carboxy (—COO—), methylene (—CH$_2$—), sulfonamido (—SO$_2$NH— and —SO$_2$NAlkyl—), sulfonic acid (—SO$_2$O—). The acyclic hydrocarbon radical Y may be derived from a glycol, glycerol, erythritol, pentaerythritol, sorbitol, tris(hydroxymethyl) aminomethane, glucamine, 1-thiosorbitol, etc., as indicated below. The hydrocarbon radical R may be alkyl, cycoalkyl, aryl, including alkylaryl or aralkyl.

The polyhydric reaction component may be a hydrocarbon diol, e. g., hexadecane-1,2-diol or pentadecane-7,8-diol, which are obtainable from olefines by peracetylation. In these X is methylene.

The polyhydric alcohol may be a thio ether, e. g., 1-alkylthiosorbitols obtained by reacting 1-thiosorbitol with halides or sulfates such as hexadecyl sodium sulfate, n-hexyl iodide, n-octyl bromide, 2-ethylhexyl bromide, 1-dodecyl chloride, 8-pentadecyl chloride, monochlorinated kerosene, cyclohexyl bromide, amylphenyl sulfate (sodium salt), bromides and sulfate esters derived from the mixture of alcohols obtained by the carboxylic reduction of coconut oil, sperm oil, beef tallow, peanut oil, etc. In these the bridging radical is sulfur.

The polyhydric alcohol may be an amine, e. g., those obtained by reacting glucamine, N-methyl glucamine, tris(hydroxymethyl)aminomethane, N-phenylglucamine and 1-aminopropane-2,3-diol with the above-mentioned halides and sulfate esters. In these the bridging radical is —NH— or —NAlkyl—.

The polyhydric alcohol may be a carbonamide, e. g., those obtained by reacting glucamine, N-methyl glucamine, N-phenylglucamine, tris(hydroxymethyl)-N-methylamino-methane, 1-aminopropane-2,3-diol, etc. with carboxylic acids such as caproic, caprylic, capric, lauric, myristic, palmitic, stearic, oleic, and mixtures of acids obtainable from natural fats and oils, and mixtures of acids obtainable by oxidizing petroleum hydrocarbons, etc. or a sulfonamide, e. g., those obtained by reacting glucamine, N-methyl glucamine, with sulfonyl chlorides such as p-toluenesulfonyl chloride but preferably the alkanesulfonyl chlorides obtainable from kerosene, white oil, paraffin wax (which contains in the molecule up to forty carbon atoms), etc., by the Reed process of sulfonation with sulfur dioxide and chlorine as described in U. S. Reissue Patent 20,968. In these the bridging radical is carbonamido —CONH— or —CONAlkyl—, or sulfonamido —SO$_2$NH— or —SO$_2$NAlkyl—.

The polyhydric alcohol may be an ether preferably (and necessarily in the case of trihydric alcohols) a monoether, e. g., those obtained by reacting the above-mentioned halides and sulfate esters with glycerol, erythritol, nonannonol, pentaerythritol, sorbitol, etc., wherein X is ether oxygen or an ester, preferably a monoester, e. g., those obtained by reacting the above-mentioned carboxylic acids or sulfonyl chlorides with glycerol, erythritol, pentaerythritol, sorbitol, etc., wherein X is —COO— or —SO$_2$O—.

Specific illustrative compounds which may be employed for reaction with aldoses and aldosides to yield the products of the invention include in addition to those already mentioned 1-(2-ethylhexyloxy)propane-2,3-diol, 1-(n-hexyloxy-)sorbitol, 1-decylthiosorbitol, 1-tetradecylthiosorbitol, N-dodecylglucamine, N - hexyl - N - phenylglucamine, N-palmitylglucamine, N-lauryl-N-methylglucamine, monoolein, monolaurin, erythritol, monolaurate, N - p - toluene - sulfonylglucamine, and N-hexadecanesulfonyl-N-methylglucamine.

In view of their relative ease of preparation, stability, and readiness to condense with the aldoses and aldosides by the process of this invention the thioethers derived from 1-thiosorbitol are preferred to the amides, sulfonamides, and amines derived from the polyhydroxylated amines which are preferred to the ethers and esters derived from the polyhydric alcohols. For the preparation of highly efficient wetting agents and detergents the preferred intermediates are pentahydric alcohols modified with an alkyl radical of eight or more carbon atoms.

In the process of this invention any water-soluble aldose or aldoside may be employed, including glucose, arabinose, galactose, lactose, maltose, cellobiose, gentiobiose, melibiose, sucrose, raffinose, and gentianose. In general, the aldosides derived from monohydric alcohols and phenols boiling below about 200° C. at 760 mm. are preferred to the free sugars since the aldosides melt without decomposition and in their molten form are better solvents for the long-chain substituted polyhydric alcohols.

Exemplary aldosides that may be used are methyl-, ethyl-, isopropyl-, butyl-, cyclohexyl-, and phenyl arabinosides, glucosides, galactosides, maltosides, lactosides, cellobiosides, gentiobiosides, and melibiosides. In view of its low cost and availability, alpha-methyl glucoside is preferred. All these aldoses and aldosides possess an aldehydic (oxocarboxylic) carbon atom. In the case of the aldoses an hydroxyl group is attached to the aldehydic carbon atom while in the aldosides an alkoxyl group is attached to the aldehydic carbon atom. The reducing disaccharide, maltose, possesses two aldehydic carbon atoms while the non-reducing disaccharide, sucrose, possesses one aldehydic carbon atom. Alkyl glucoside polymers, such as polymethyl glucoside, which apparently have a methoxy group attached to a terminal aldehydic carbon atom, can be used. While the hydroxyl group attached to the aldehydic carbon atom or the oxygen atom linking the alkoxy group or the sugar group with the aldehydic carbon atom may be responsible for the condensation with the polyhydric alcohols employed in this invention, no absolute proof of the existence of glucosidic linkages in the products has been obtained. In this specification aldoses designate sugars which possess an aldehyde group. The aldehyde group does not, in general, exist free but in union, probably hemi-acetal, with a hydroxyl group of the same molecule if a 5- or 6-membered ring can be formed within the molecule, as in glucose. Aldosides are substances which on hydrolysis give simple aldoses, for example, maltose, sucrose, raffinose, alpha-methyl glucoside, etc. For the purposes of this invention the water-soluble aldoses and the aldose portion of the water-soluble aldosides preferably contain at least 5 carbon atoms, since these intermediates are either available or readily manufactured.

The preferred proportions of reactants depends on the nature of the polyhydric alcohol and the aldose or aldoside employed in the reaction. Polyhydric alcohols containing a large number, e. g., at least eight, of carbon atoms in the R portion of the molecule are generally reacted with large proportions of the aldose or aldoside. Where the polyhydric alcohol contains less than eight carbons in the R portion a smaller proportion of aldose or aldoside may be used to obtain soluble products. When using 1-alkylthiosorbitols, detergents with satisfactory solubility in water are obtained by using two moles of alpha-methyl glucosides. Larger proportions of alpha-methyl glucoside may be employed but for reasons of economy are usually less desirable. The solubility characteristics depend upon the kind and length of the hydrocarbon chain in the R portion of the molecule as well as the amount of the aldose and aldoside. In general, more soluble products are obtained with smaller carbon chains. The solutions and emulsions, respectively, are stable to acids and to alkalis and to the agents causing hardness in water. The preferred products are, generally speaking, soluble or readily dispersible in water and in organic solvents such as ethyl alcohol, methyl alcohol, benzene, acetic acid, etc.

Strong acids or compounds capable of yielding strong acids at the reaction temperature are preferred catalysts for the condensation. Useful catalysts include sulfuric acid, dimethyl sulfate, iodine, dodecyldimethylsulfonium iodide, ammonium chloride, ammonium thiocyanate, piperidine hydrochloride, p-toluenesulfonic acid, hexadecylpyridinium bromide, boron trifluoride in methanol, sulfanilic acid, hydrochloric acid, hydrobromic acid, sulfamic acid, the chloroacetic acids, etc. By the terms "strong acid" is meant acids having an ionization constant of at least $1 \times 10^{-3}$. Carboxylic acids such as acetic acid have little if any catalytic effect.

It is preferred to use about 0.001 to 1.0 per cent of catalyst based on the aldose or aldoside employed. The use of amounts of catalyst in excess of 1% generally results in some degradation and causes the reaction to proceed with considerable violence. However, when using basic polyhydroxy compounds such as polyhydroxy nitrogen compounds it is sometimes necessary to employ substantially larger amounts of catalyst than one per cent.

Temperatures ranging from 100° up to 250° C. may be employed for the condensation. The temperature will depend somewhat on the aldose or the aldoside used. The aldosides tolerate higher temperatures but react more readily even at lower temperatures than the aldoses. In most cases it is preferred to heat the reaction mixture to that temperature at which the reaction is in molten condition and at which point there is a continual evolution of alcohol or water.

The time required for carrying out the condensation ranges from a few minutes to several hours depending on the temperature, and catalyst. Thus, at higher temperatures, e. g., 175°–225° C. using a sulfonium salt as catalyst, a faster rate of reaction is obtained between alpha-methyl glucoside and 1-dodecylthiosorbitol than is obtained at lower temperatures, e. g., 125° to 150° C. using the same catalyst. Similarly, a more rapid reaction is obtained when a catalyst, e. g., dodecyldimethylsulfonium iodide or iodine is used than is obtained when a less active catalyst such as an acid having an ionization constant less than $1 \times 10^{-3}$ is used. In general, the condensation of the reactants to homogeneous water-soluble products is completed in about one to three hours.

While the reaction is preferably carried out in the absence of solvents, inert solvents, e. g., dioxane may be employed.

The new compositions disclosed in this invention belong to the class of capillary-active materials in that they have colloidal properties and therefore may be advantageously used in any process involving wetting, penetrating, deterging, dispersing, emulsifying, frothing, foaming, and kindred phenomena. These compositions may be employed in pure or standardized form and, if desired, in conjunction with known processing or treating agents. They may be used by themselves or in combination with other surface-active agents in any relation in which surface-active agents having colloidal properties have heretofore been used in the textile, leather, lacquer, paper, rubber, and like industries. A few of the more important uses of these new products as textile assistants are given below to illustrate the importance and widespread applicability of these new products in the textile industry. They may be used alone or in combination with suitable detergents for cleansing and scouring vegetable, animal, and synthetic fibers when removing fatty or oily materials or in general in place of soap for cleansing operations. They may advantageously be employed as cleansing agents in hard water. The new products have capillary-active properties of different degree, depending upon the nature of the water-solubilizing radical and the length of the monovalent hydrocarbon radical R and the consequent degree of solubility and dispersing power in water. Thus, comparing the products of Examples I, II, and III, the dodecyl and hexadecyl compounds are better wool scouring agents than the octyl compounds. On the other hand, the octyl compound exhibits a greater wetting action and results in a more rapid wetting out of fabrics. Furthermore, the nature of the polyhydric alcohol intermediates also contributes its influence on the degree of solubility and dispersing power in water. Thus, the product of Example I had greater dispersing power as a function of its greater solubility in water than the product of Example IX. These products are useful as auxiliary agents for various purposes in the dyeing industry, e. g., as dyeing agents, leveling assistants and the like. The new products may be used with agents preventing the precipitation on the fibers of insoluble inorganic salts caused by the hardness of the water. If desired, they may be used in admixture with adjuvants, e. g., water-soluble salts of phosphoric acid such as alkali pyrophosphates or alkali meta-phosphates, other inorganic salts, e. g., those altering the pH value of the mixture such as sodium carbonate, sodium silicate, or pure diluents such as sodium sulfate or sodium chloride, bleaching agents, or the like.

The above description and examples are intended to be illustrative only. Any modification of or variation therefrom which conforms to the spirit of the invention is intended to be included within the scope of the claims.

What is claimed is:

1. A water-soluble, surface-active condensation product of one mole of 1-dodecylthiosorbitol with two moles of alpha-methyl glucoside.

2. A water-soluble, surface-active condensation product of 1-dodecylthiosorbitol with alpha-methyl glucoside.

3. A water-soluble, surface-active condensation product of a water-soluble aldoside of an alcohol boiling below 200° C. at 760 mm. with a 1-alkyl-thiosorbitol wherein the alkyl group is of at least eight, but not more than forty, carbon atoms.

4. A water-soluble, surface-active condensation product of a 1-alkylthiosorbitol wherein the alkyl group is of at least six, but not more than forty, carbon atoms with a water-soluble aldoside.

5. A water-soluble, surface-active condensation product of a water-soluble aldoside with a polyhydric alcohol $(HO)_nYXR$, wherein Y is an acyclic hydrocarbon radical of valence $n+1$, $n$ is an integer at least two and preferably five, R is a monovalent acyclic hydrocarbon radical of six to forty carbon atoms and preferably eight to twenty-five carbon atoms, and X is a bridging radical of the class consisting of —O—, —S—, —CONH—, —CONAlkyl—, —COO—, —NAlkyl—, —NH—, —CH₂—, —SO₂NH—, —SO₂NAlkyl—, and —SO₂O—.

6. A water-soluble, surface-active condensation product of a member of the class consisting of water-soluble aldoses and water-soluble aldosides with a polyhydric alcohol of at least two carbon atoms containing, attached to the hydrocarbon radical bearing the hydroxyl through a bridging radical of the class consisting of —O—, —S—, —CONH—, —CONAlkyl—, —COO—, —NAlkyl—, —NH—, —CH₂—, —SO₂NH—, —SO₂NAlkyl—, and —SO₂O—, an acyclic hydrocarbon radical of six to forty carbon atoms.

7. Process of preparing water-soluble, surface-active condensation products which comprises reacting by heating to reaction temperature within the range 100–250° C. a member of the class consisting of water-soluble aldoses and water-soluble aldosides with a polyhydric alcohol of at least two carbon atoms containing, attached to the hydrocarbon radical bearing the hydroxyl through a bridging radical of the class consisting of —O—, —S—, —CONH—, —CONAlkyl—, —COO—, —NAlkyl—, —NH—, —CH₂—, —SO₂NH—, —SO₂NAlkyl—, and —SO₂O—, an acyclic hydrocarbon radical of six to forty carbon atoms in the presence of an acidic catalyst.

8. Process of preparing water-soluble, surface-active condensation products which comprises reacting by heating to reaction temperature within the range 100–250° C. a water-soluble aldoside with a polyhydric alcohol of at least two carbon atoms containing, attached to the hydrocarbon radical bearing the hydroxyl through a bridging radical of the class consisting of —O—, —S—, —CONH—, CONAlkyl—, —COO—, —NAlkyl—, —NH—, —CH₂—, —SO₂NH—, —SO₂NAlkyl—, and —SO₂O—, an acyclic hydrocarbon radical of six to forty carbon atoms in the presence of an acidic catalyst.

9. Process of preparing water-soluble-surface-active condensation products which comprises reacting by heating to reaction temperature within the range 100–250° C. a 1-alkylthiosorbitol wherein the alkyl group is of at least six, but not more than forty, carbon atoms with a water-soluble glucoside in the presence of a catalyst.

10. Process of preparing water-soluble, surface-active condensation products which comprises reacting by heating to reaction temperature within the range 100–250° C. a 1-alkylthiosorbitol wherein the alkyl group is of at least six, but not more than forty, carbon atoms with a water-soluble glucoside in the presence of an acidic catalyst.

11. Process of preparing water-soluble, surface-active condensation products which comprises reacting by heating to reaction temperature within the range 100–250° C. 1-dodecylthiosorbitol with alpha, methyl glucoside in the presence of a sulfonium salt.

PAUL LAWRENCE SALZBERG.
JAMES HERBERT WERNTZ.